United States Patent
Park et al.

(10) Patent No.: US 9,807,345 B2
(45) Date of Patent: Oct. 31, 2017

(54) METHOD FOR DISPLAYING EPG INFORMATION INCLUDING BUDDY INFORMATION AND RECEIVER APPLYING THE SAME

(75) Inventors: Jong-chan Park, Gyeonggi-do (KR); Hee-jeong Bae, Gyeonggi-do (KR); Bo-kyung Shim, Seoul (KR); Jin-ho Yim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 29 days.

(21) Appl. No.: 13/013,111

(22) Filed: Jan. 25, 2011

(65) Prior Publication Data

US 2011/0185385 A1    Jul. 28, 2011

(30) Foreign Application Priority Data

Jan. 27, 2010    (KR) ........................ 10-2010-0007410

(51) Int. Cl.
| | | |
|---|---|---|
| *H04H 60/33* | (2008.01) | |
| *H04N 7/173* | (2011.01) | |
| *H04N 21/4788* | (2011.01) | |
| *H04N 21/482* | (2011.01) | |
| *H04N 21/488* | (2011.01) | |
| *H04N 21/25* | (2011.01) | |

(52) U.S. Cl.
CPC ........... *H04N 7/173* (2013.01); *H04N 21/252* (2013.01); *H04N 21/4788* (2013.01); *H04N 21/4821* (2013.01); *H04N 21/4882* (2013.01)

(58) Field of Classification Search
CPC .......................... H04N 21/482; H04N 21/4821
USPC ...................................................... 725/9, 39
See application file for complete search history.

(56) References Cited

U.S. PATENT DOCUMENTS

| | | | |
|---|---|---|---|
| 8,438,598 B2 | 5/2013 | Sakai et al. | |
| 9,185,348 B2 | 11/2015 | Choi et al. | |
| 2002/0112239 A1* | 8/2002 | Goldman | ............... H04H 60/39 725/46 |
| 2006/0271953 A1 | 11/2006 | Jacoby et al. | |
| 2006/0271959 A1 | 11/2006 | Jacoby et al. | |
| 2006/0271960 A1 | 11/2006 | Jacoby et al. | |
| 2006/0271961 A1* | 11/2006 | Jacoby | ............... H04N 7/17318 725/46 |
| 2006/0271997 A1 | 11/2006 | Jacoby et al. | |
| 2007/0101368 A1 | 5/2007 | Jacoby et al. | |

(Continued)

FOREIGN PATENT DOCUMENTS

| | | |
|---|---|---|
| EP | 1 841 220 | 10/2007 |
| JP | 2007-158925 | 6/2007 |

(Continued)

OTHER PUBLICATIONS

Korean Office Action dated Oct. 15, 2015 issued in counterpart application No. 10-2010-0007410, 12 pages.

(Continued)

*Primary Examiner* — Michael Hong
(74) *Attorney, Agent, or Firm* — The Farrell Law Firm, P.C.

(57) ABSTRACT

A method for displaying Electronic Program Guide (EPG) information and a receiving apparatus where the receiving apparatus displays buddy information on an EPG screen, for displaying EPG information, allowing a user to easily identify which programs his or her friends registered in a buddy list, are watching.

18 Claims, 13 Drawing Sheets

(56) References Cited

U.S. PATENT DOCUMENTS

| | | |
|---|---|---|
| 2007/0250895 A1 | 10/2007 | Yamada |
| 2009/0064230 A1* | 3/2009 | Hung ................. H04N 5/44543 |
| | | 725/47 |
| 2009/0103893 A1* | 4/2009 | Sugino .................. H04N 5/782 |
| | | 386/292 |
| 2009/0133071 A1* | 5/2009 | Sakai ................... H04N 5/4403 |
| | | 725/46 |
| 2009/0271820 A1* | 10/2009 | Choi .................... H04N 21/252 |
| | | 725/37 |
| 2009/0271826 A1* | 10/2009 | Lee .................... H04N 5/44543 |
| | | 725/46 |
| 2010/0071000 A1* | 3/2010 | Amento ................. H04N 7/173 |
| | | 725/39 |
| 2011/0126258 A1* | 5/2011 | Emerson et al. ............. 725/133 |
| 2013/0133005 A1 | 5/2013 | Sakai et al. |

FOREIGN PATENT DOCUMENTS

| | | |
|---|---|---|
| JP | 2009-141952 | 6/2009 |
| KR | 1020070098407 | 10/2007 |
| KR | 1020070100966 | 10/2007 |
| KR | 1020090112535 | 10/2009 |
| WO | WO 02/102079 | 12/2002 |

OTHER PUBLICATIONS

Korean Office Action dated May 11, 2016 issued in counterpart application No. 10-2010-0007410, 8 pages.
European Search Report dated Jan. 19, 2017 issued in counterpart application No. 11737288.8-1908, 5 pages.

* cited by examiner

METHOD FOR DISPLAYING EPG INFORMATION INCLUDING BUDDY INFORMATION AND RECEIVER APPLYING THE SAME

PRIORITY

This application claims priority under 35 U.S.C. §119(a) to a Korean Patent Application No. 2010-0007410, filed in the Korean Intellectual Property Office on Jan. 27, 2010, the disclosure of which is incorporated herein by reference.

BACKGROUND OF THE INVENTION

1. Field of the Invention

The present invention relates generally to a method for displaying Electronic Program Guide (EPG) information and a receiver applying the same, and more particularly, to a method for displaying EPG information along with information regarding a friend on an EPG screen received through a broadcast signal and a receiver applying the same.

2. Description of the Related Art

Information regarding a television program is generally provided in the form of publication in a newspaper, on television, or in a magazine. As numerous programs are provided through a plurality of channels in a digital multi-channel broadcast system, a user has a variety of channels to select from, but at the same time, it has become that much complicated for the user to select a desired channel.

In such a digital multi-channel broadcast system, EPG is provided as a basic data service for various information such as a program table or information regarding each program.

Recently, as Internet communication has become popularized, a television may be connected via Internet network. Accordingly, services using Internet network on a television has been increasing. A prime example of such services is an Internet television.

With the development of technology, a television may provide various functions using Internet in addition to receiving and displaying broadcast. For example, a television may provide a text chatting function using Internet network. Furthermore, users may chat with each other users via Internet while watching the same program on a television.

As such, a user may communicate with other users using a television. Therefore, a method for providing communication systematically and conveniently among a plurality of television users is required.

SUMMARY OF THE INVENTION

The present invention has been made to address at least the above problems and/or disadvantages and to provide at least the advantages described below. Accordingly, an aspect of the present invention provides a method for displaying EPG information along with information regarding a friend on an EPG screen for displaying EPG information and a receiver applying the same.

According to one aspect of the present invention, a receiving apparatus includes a communication unit which receives information regarding at least one friend registered in a predetermined list from an external device, a display unit which displays an EPG screen for displaying the EPG information, and a controlling unit which controls to display the information regarding a friend on the EPG screen.

According to another aspect of the present invention, a method for displaying EPG information includes receiving an EPG information, receiving information regarding at least one friend registered in a predetermined list from an external server, displaying an EPG screen for displaying the EPG information, and displaying the information regarding a friend on the EPG screen.

The method may further include, if a friend who is watching a same program broadcast in the currently selected channel is selected, displaying a menu for selecting a function corresponding to the selected friend.

The method may further include, if a friend who is watching a different program that is broadcast in the currently selected channel, displaying a menu for changing a current channel to a channel that the selected friend is watching.

Displaying the information regarding a friend may further include displaying comments input by a friend who reserves the program to correspond to the broadcast program.

The method may further include, if a friend corresponding to a program reserved by the friend is selected, displaying a menu for reserving the program.

The method may further include displaying programs on the EPG screen according to one method among a method of displaying only programs corresponding to the information regarding a friend, a method of displaying only programs having comments input by the friend, and a method for displaying only programs reserved by the friend.

As such, according to various embodiments of the present invention, a method for displaying EPG information in which information regarding a friend is displayed on the EPG screen for displaying EPG information and a receiving apparatus applying the same are provided. Therefore, a user may easily identify which programs his or her friends registered in a predetermined list are watching.

In addition, a user may select a friend displayed on the screen and send a message or share content with the selected friend. Accordingly, the user may communicate with his or her friends more intuitively.

BRIEF DESCRIPTION OF THE DRAWINGS

The above and/or other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
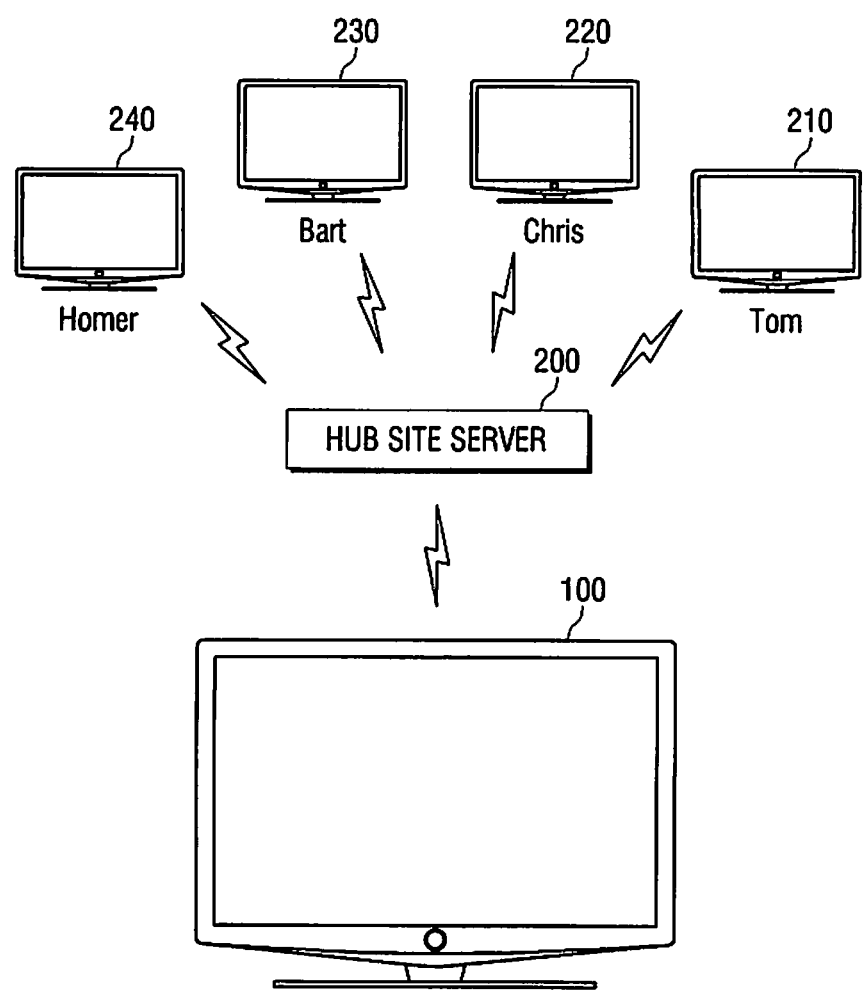
FIG. 1 is a diagram illustrating a system for providing a buddy list through a plurality of televisions according to an embodiment of the present invention.

Certain embodiments of the present invention are described in more detail below with reference to the accompanying drawings.

In the following description, similar reference numerals are used for similar elements, throughout the drawings. The matters defined in the description, such as detailed construction and elements, are provided to assist in a comprehensive understanding of the embodiments of the present invention. However, the present invention can be practiced without those specifically defined matters. Also, well-known functions or constructions are not described in detail since they would obscure the present invention with unnecessary detail.

FIG. 1 is a diagram illustrating a system for providing a predetermined list through a plurality of televisions according to an embodiment of the present invention. The predetermined list may include the list regarding information regarding a friend, and may be referred as buddy list. As illustrated in FIG. 1, a Television (TV) 100 is communicably connected to a hub site server 200. And although not illustrated, a Television 100 may be communicably connected to other device, for instance, mobile phone, portable computer and etc.

Herein, the hub site server 200 is a server which is connected to the TV 100 and provides various services to the TV 100. Specifically, the hub site server 200 provides buddy management function to the TV 100.

Herein, the buddy management function allows a user of the TV 100 to register other users as friends and manage them in a separate buddy list. Accordingly, the TV 100 may receive information regarding the users registered as friends in the buddy list from the server 200. The TV 100 may register or delete friends in or from the buddy list and update a buddy list in the hub site server 200 through user input.

The TV 100 may receive information regarding each friend from the server 200. The information regarding a friend represents information regarding each friend who is registered in the buddy list. The information regarding a friend includes at least one of the ID, name, currently watching broadcast program, reserved broadcast program, comments on a broadcast program, and emoticon of a user who is registered as a friend. Herein, the comments refer to a message written and input by a user of the TV 100 or a friend regarding a specific broadcast program.

As illustrated in FIG. 1, the user of the TV 100 registers Tom, Chris, Bart, and Homer as friends. As illustrated in FIG. 1, Tom's TV 210, Chris' TV 220, Bart's TV 230, and Homer's TV 240 are connected to the hub site server 200.

Accordingly, the TV 100 receives a buddy list including Tom, Chris, Bart, and Homer from the hub site server 100. The TV 100 receives information regarding each of Tom, Chris, Bart, and Homer from the hub site server 100.

As such, the TV 100 provides a buddy management function through the hub site server 200. Such a service which provides communication among a plurality of television users is referred to as a Social Network Service (SNS). Therefore, the buddy management function may be regarded as a type of SNS, and the buddy list and information regarding a friend may be regarded as SNS data.

Figure 2:
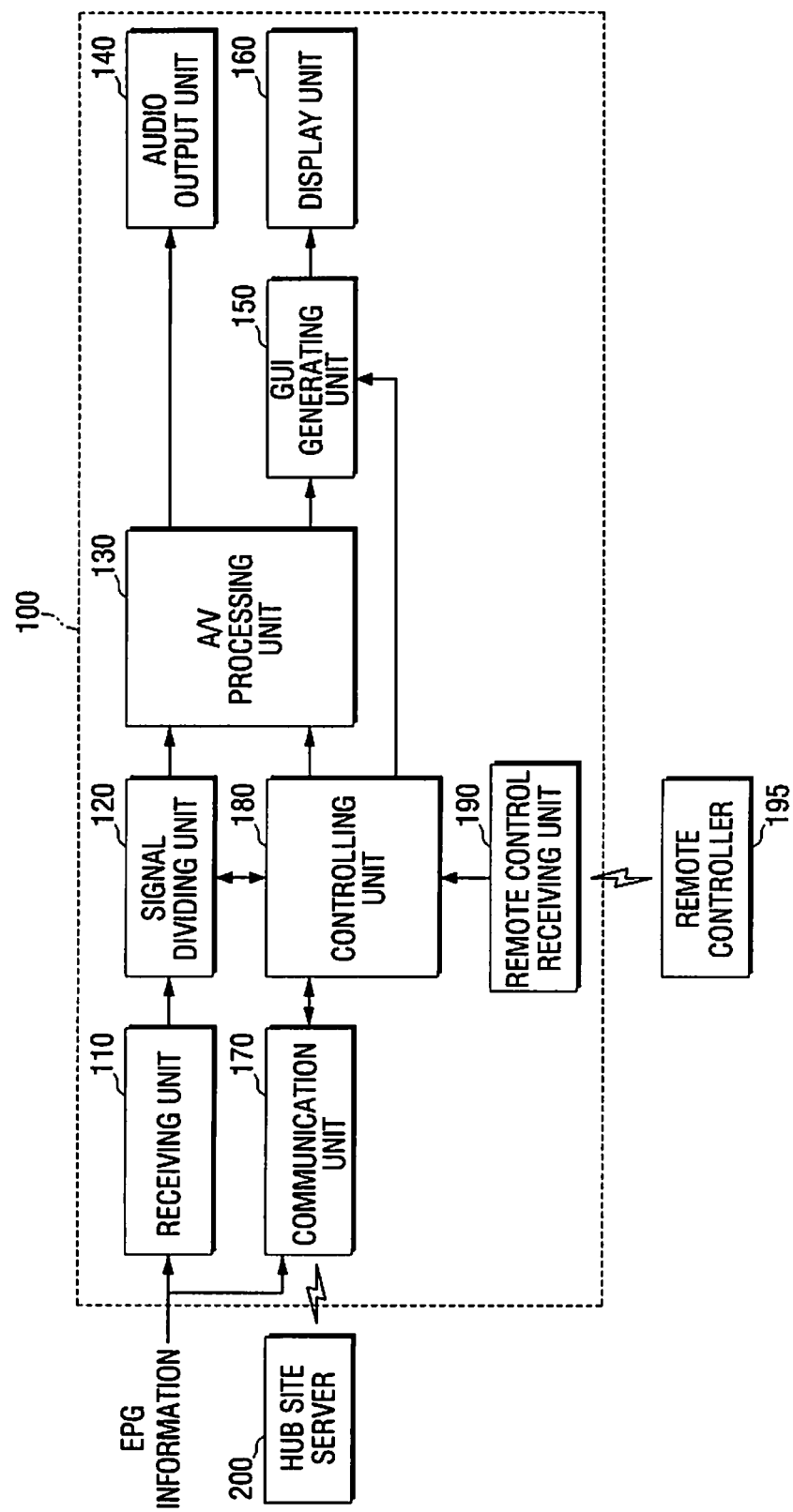
FIG. 2 is a block diagram illustrating the detailed configuration of a television according to an embodiment of the present invention.

Hereinafter, the configuration of a television will be explained in greater detail with reference to FIG. 2. FIG. 2 is a block diagram illustrating the detailed configuration of the TV 100 according to an embodiment of the present invention. As illustrated in FIG. 2, the TV 100 comprises a receiving unit 110, a signal dividing unit 120, an Audio/Video (A/V) processing unit 130, an audio output unit 140, a Graphical User Interface (GUI) generating unit 150, an image output unit 160, a communication unit 170, a controlling unit 180, a remote control receiving unit 190, and remote controller 195.

The receiving unit 110 receives a broadcast signal from a broadcasting station or a satellite via wire or wirelessly and demodulates the received broadcast signal. Herein, the broadcast signal includes an image signal, an audio signal and EPG information. However the receiving unit 110 may receive the EPG information only through wireless communication or Bluetooth from external device. The signal dividing unit 120 divides a broadcast signal into an image signal, an audio signal, and EPG information. The signal dividing unit 120 transmits the image signal and the audio signal to the A/V processing unit 130 and the EPG information to the controlling unit 180.

The A/V processing unit 130 performs signal processing such as video decoding, video scaling, and audio decoding on the image signal and audio signal input from the signal dividing unit 120. The A/V processing unit 130 outputs the image signal to the display unit 160, and the audio signal to the audio output unit 140.

The audio output unit 140 outputs audio from the A/V processing unit 130 through a speaker or an external apparatus (for example, an external speaker) connected through an external output terminal.

The GUI generating unit 150 generates a GUI to be displayed on the screen and adds the generated GUI to an image output from the A/V processing unit 130. Specifically, the GUI generating unit 150 generates a GUI for an EPG screen which displays received EPG information.

Figure 4:
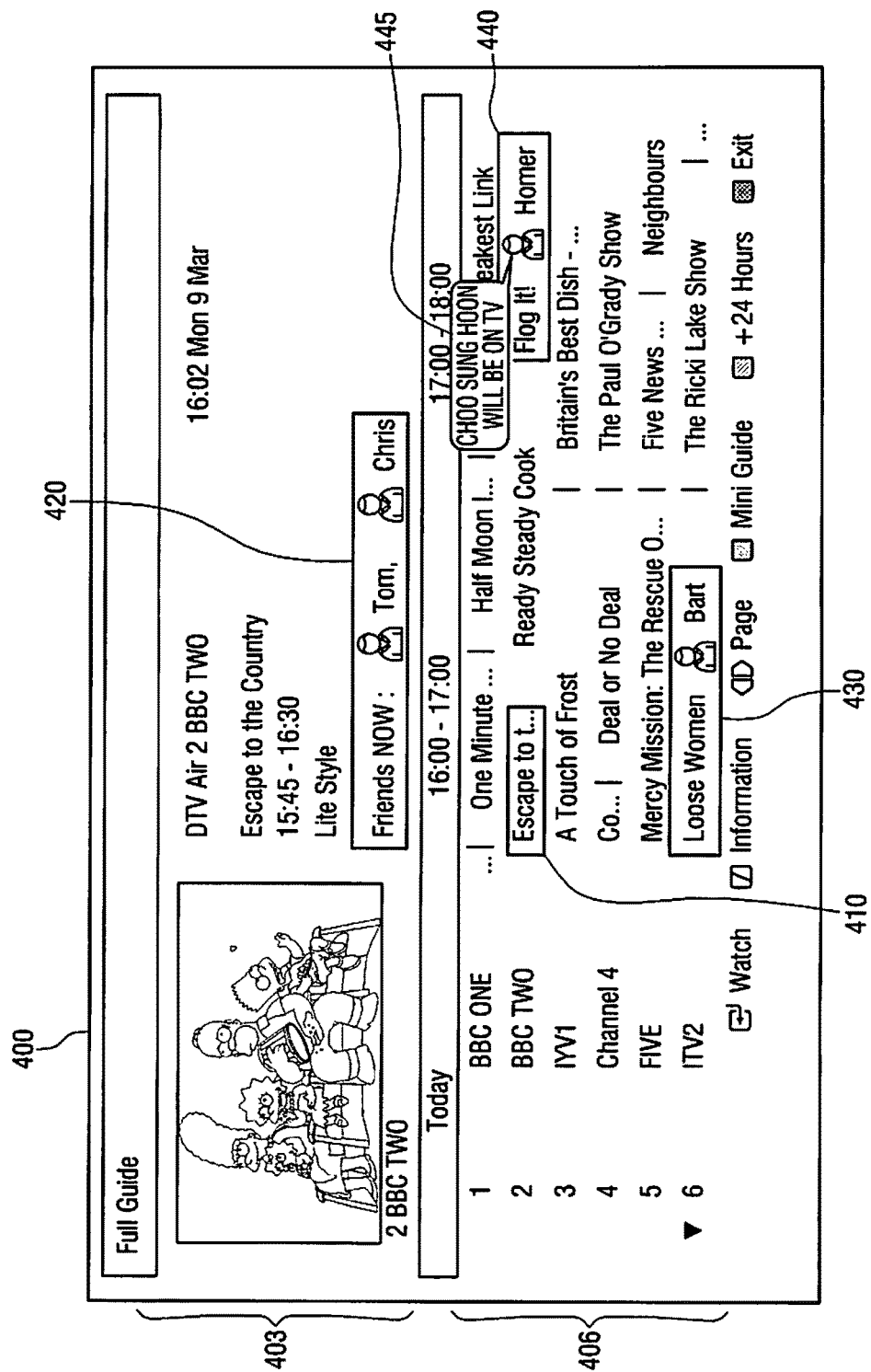
FIG. 4 is a diagram illustrating an EPG screen on which information regarding a friend is displayed according to an embodiment of the present invention.

The display unit 160 displays an image output from the A/V processing unit 130 on the screen. The display unit 160 displays an EPG screen for displaying EPG information. Herein, the EPG screen refers to a screen which displays channels and programs provided by the TV 100 based on EPG information. For example, the EPG screen displays programs for each channel and each time slot and also displays the channel and program currently selected on the TV 100. An example of the EPG screen is illustrated in FIG. 4.

The communication unit 170 is communicably connected to the hub site server 200 via the Internet. The communication unit 170 receives information regarding a friend which is information regarding at least one user registered in the buddy list from the hub site server 200. Also the communication unit 170 may receive the EPG information through wireless communication or Bluetooth from external device.

The remote controller 195 receives user input and transmits the entered user input to the remote control receiving unit 190. A user may input a desired command using the remote controller 195. A user may select one of the buddies displayed on an EPG screen using the remote controller 195.

The controlling unit 180 identifies a user command based on user input transmitted from the remote controller 195, and controls the overall operation of the TV 100 according to the identified user command.

The controlling unit 180 controls to display information regarding a friend on an EPG screen. Specifically, the controlling unit 180 controls to display a friend who is watching a broadcast program from among friends registered in a buddy list so as to correspond to the broadcast program that he or she is watching. That is, the controlling unit 180 controls to display programs along with a friend who is currently watching the programs on the EPG screen.

The controlling unit 180 may display the icon and name of a friend who is currently watching a program next to the name of the program. The controlling unit 180 may control to display the icon and name of a friend who is watching a program which is currently selected in an area where the currently selected channel is displayed.

If a friend who is watching a program of a channel that is currently selected on the TV 100 is selected by a user, the controlling unit 180 may control to display a menu for selecting a function corresponding to the selected friend. Herein, the menu includes an option for sending a message to the selected friend and an option for sharing content with the selected friend. Detailed description regarding the menu will be explained below with regard to FIGS. 5A and 5B.

If a friend who is watching a program of a channel that is different from a currently selected channel, the controlling unit 180 may control to display a menu for changing the current channel to the channel that the friend is watching. Detailed description regarding the menu will be explained below with reference to FIGS. 6A and 6B.

The controlling unit 180 may control to display information regarding a friend who reserves a broadcast program from among a plurality of users registered in a buddy list to correspond to the broadcast program on the EPG screen. The controlling unit 180 controls to display comments input by the friend who reserves the broadcast program to correspond to the broadcast program. If a friend corresponding to the program reserved by the friend is selected, the controlling unit 180 controls to display a menu for reserving the program. Detailed description regarding this menu will be explained below with reference to FIGS. 7A and 7B.

Furthermore, the controlling unit 180 may control to display programs on the EPG screen according to at least one method among a method of displaying only programs corresponding to information regarding a friend, a method of displaying only programs having comments input by a friend, and a method for displaying only programs reserved by a friend. The displaying method may be selected by a user, which will be explained in detail later with reference to FIG. 8.

Since the TV 100 displays information regarding a friend on the EPG screen with regard to watching and reserving each broadcast program, a user may easily identify which programs his or her friends registered in the buddy list watch or reserve through the EPG screen. As a user may select friends displayed on the EPG screen to send a message or share content, the user may easily communicate with the friends registered in the buddy list through the EPG screen.

Figure 3:
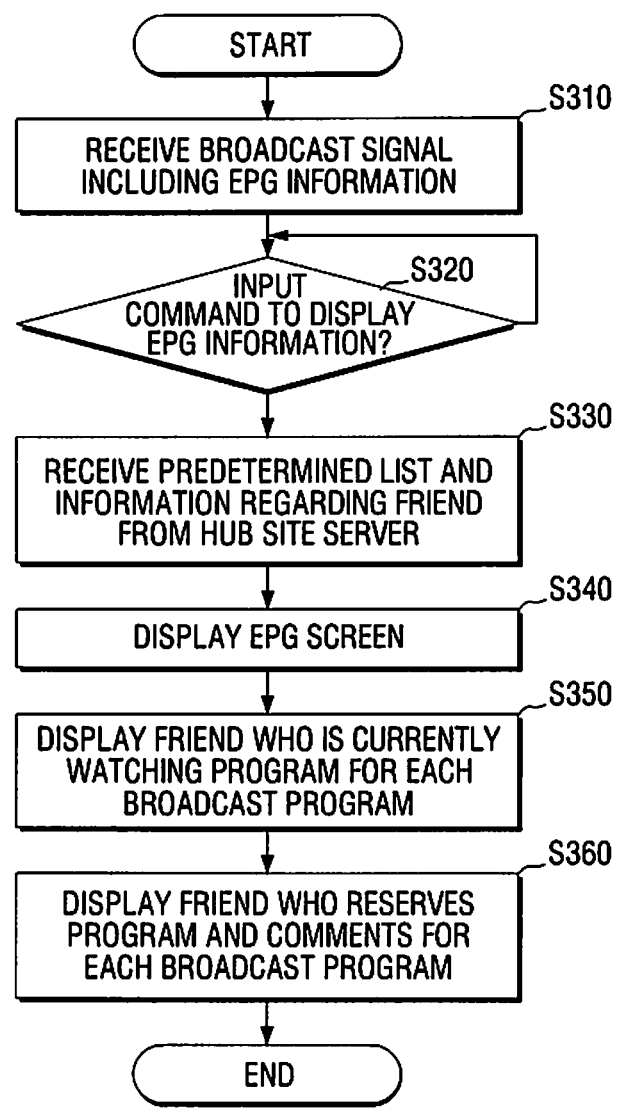
FIG. 3 is a flowchart to explain a method for displaying EPG information according to an embodiment of the present invention.

Hereinafter, a method for displaying EPG information will be explained in detail with reference to FIG. 3. FIG. 3 is a flowchart to explain a method for displaying EPG information according to an embodiment of the present invention.

As illustrated in FIG. 3, the TV 100 receives a broadcast signal including EPG information in Step 310. The TV 100 determines whether a command to display EPG information is input from a user in Step 320. Herein, the command to display EPG information is a command to display an EPG screen.

If a command to display EPG information is input from a user in Step 320-Y, the TV 100 receives a buddy list and information regarding a friend from the hub site 200 in Step 330. Subsequently, the TV 100 displays an EPG screen in Step 340.

The TV 100 displays friends who are watching each program on the EPG screen in Step 350. Specifically, the TV 100 controls to display information regarding a friend on the EPG screen. The TV 100 displays friends who are watching broadcast programs from among a plurality of friends registered in the buddy list to correspond to the broadcast programs that they are watching. That is, the TV 100 displays friends who are currently watching programs on the programs included in the EPG screen.

The TV 100 displays the icon and name of a friend who is currently watching a program next to the name of the program. The TV 100 displays the icon and name of a friend who is watching a program of a channel which is currently selected in an area where the currently selected channel is displayed.

If a friend who is watching a program of a channel that is currently selected on the TV 100 is selected by a user, the TV 100 displays a menu for selecting a function corresponding to the selected friend. Herein, the menu includes an option for sending a message to the selected friend and an option for sharing content with the selected friend. Detailed description regarding the menu will be explained below with regard to FIGS. 5A and 5B.

If a friend who is watching a program of a channel that is different from a currently selected channel, the TV 100 displays a menu for changing the current channel to the channel that the friend is watching. Detailed description regarding the menu will be explained below with reference to FIGS. 6A and 6B.

The TV 100 displays users who reserve each broadcast program and comments on each program on the EPG screen in Step 360. Specifically, the TV 100 may display information regarding a friend who reserves a broadcast program from among a plurality of users registered in a buddy list to correspond to the broadcast program on the EPG screen. The TV 100 displays comments input by the friend who reserves the broadcast program to correspond to the broadcast program. If a friend corresponding to the program reserved by the friend is selected, the TV 100 displays a menu for reserving the program. Detailed description regarding this menu will be explained below with reference to FIGS. 7A and 7B.

Furthermore, the TV 100 may display programs on the EPG screen according to at least one method among a method of displaying only programs corresponding to information regarding a friend, a method of displaying only programs having comments input by a friend, and a method for displaying only programs reserved by a friend. The displaying method may be selected by a user, which will be explained in detail later with reference to FIG. 8.

Through the above processes, the TV 100 displays information regarding a friend on the EPG screen with regard to watching and reserving each broadcast program and thus, a user may easily identify which programs his or her friends registered in the buddy list watch or reserve through the EPG screen. As a user may select friends displayed on the EPG screen to send a message or share content, the user may easily communicate with the friends registered in the buddy list through the EPG screen.

Hereinafter, a screen for displaying EPG information will be explained in detail with reference to FIGS. 4 to 10. FIG. 4 is a diagram illustrating the screen configuration of an EPG screen 400 on which information regarding a friend is displayed according to an embodiment of the present invention.

As illustrated in FIG. 4, the EPG screen 400 comprises a current channel display area 403 and a channel list display area 406. The current channel display area 403 is an area where information regarding a currently selected channel is displayed, and the channel list display area 406 is an area where a list of channels provided by the TV 100 is displayed.

As illustrated in FIG. 4, a program broadcast in a currently selected channel is displayed in a small screen, and a channel name, a program title, and a broadcast time are displayed in the current channel display area 403.

Friends who are watching a currently selected broadcast program are displayed in Friends NOW area 420 within the current channel display area 403. Specifically, as illustrated in FIG. 4, "Tom" and "Chris" are displayed as friends who are watching a currently selected broadcast program. That is, "Escape to the Country" is selected on the TV 100, and "Tom" and "Chris" from among friends included in a buddy list are watching "Escape to the Country".

As such, information regarding a friend who is watching a currently selected program is displayed on the current channel display area 403 of the EPG screen 400.

As illustrated in FIG. 4, programs broadcast for each channel and each time are displayed in the channel list display area 406. A currently selected program 410 is displayed in a box.

Furthermore, a friend who is watching a program 430 which is different from a currently selected program is also displayed. As illustrated in FIG. 4, a program titled "Loose Women" is watched by "Bart" who is included in the buddy list.

A program 440 reserved by a friend is also displayed on the EPG screen 400. As illustrated in FIG. 4, a program 440 titled "Flog It" is reserved by "Homer" who is included in the buddy list. It can be seen that comments 445 written by "Homer" are displayed in the program 440 called "Flog It". The comments 445 written by "Homer" are transmitted to the TV 100 through the hub site server 200.

As such, the EPG screen 400 displays information regarding a friend with respect to watching and reserving each broadcast program and thus, a ser may easily identify which programs his or her friends registered in the buddy list watch or reserve through the EPG screen 400.

Figure 5A:
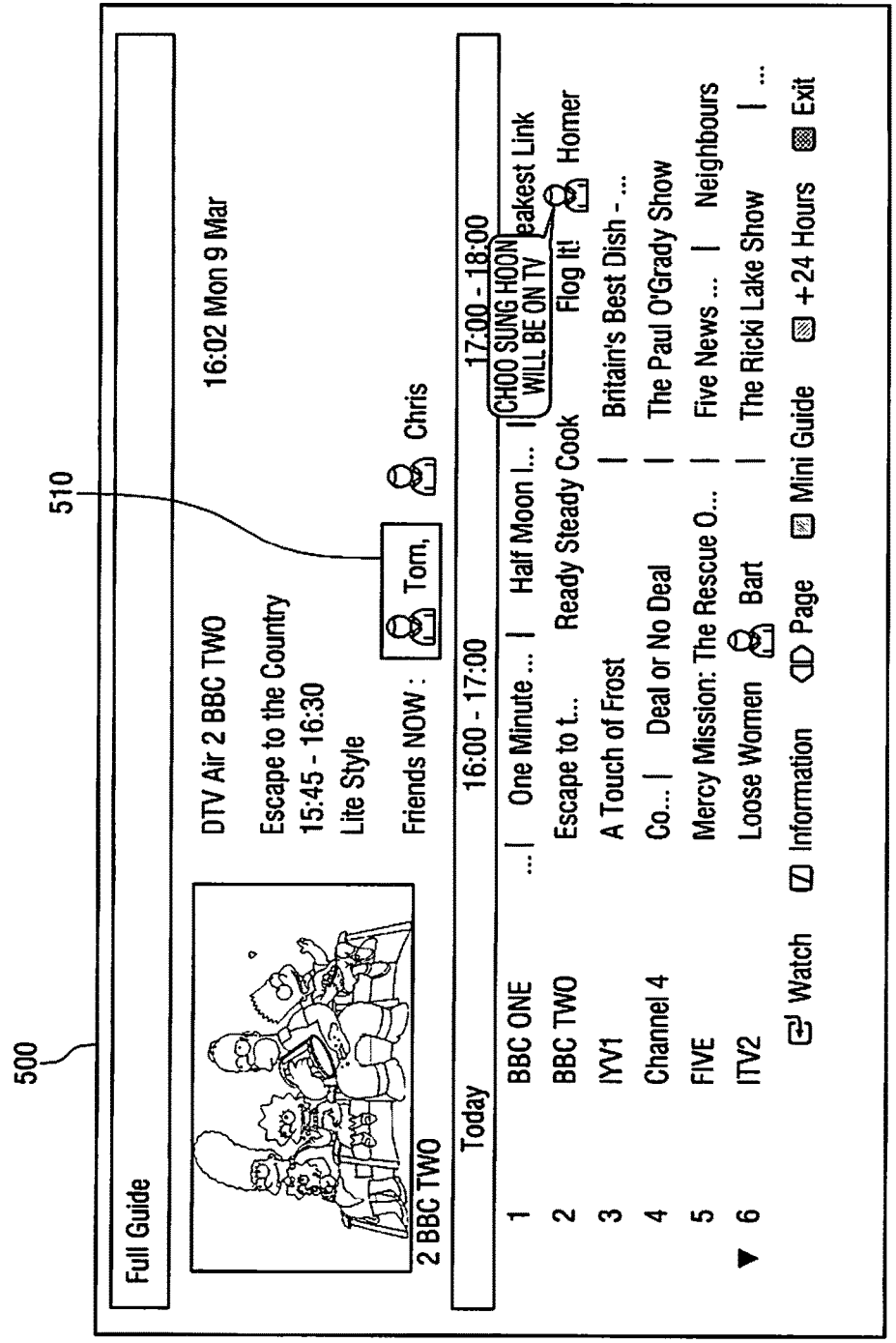
FIGS. 5A and 5B are diagrams illustrating a case where a friend watching the same program is selected on an EPG screen according to an embodiment of the present invention.
Figure 5B:
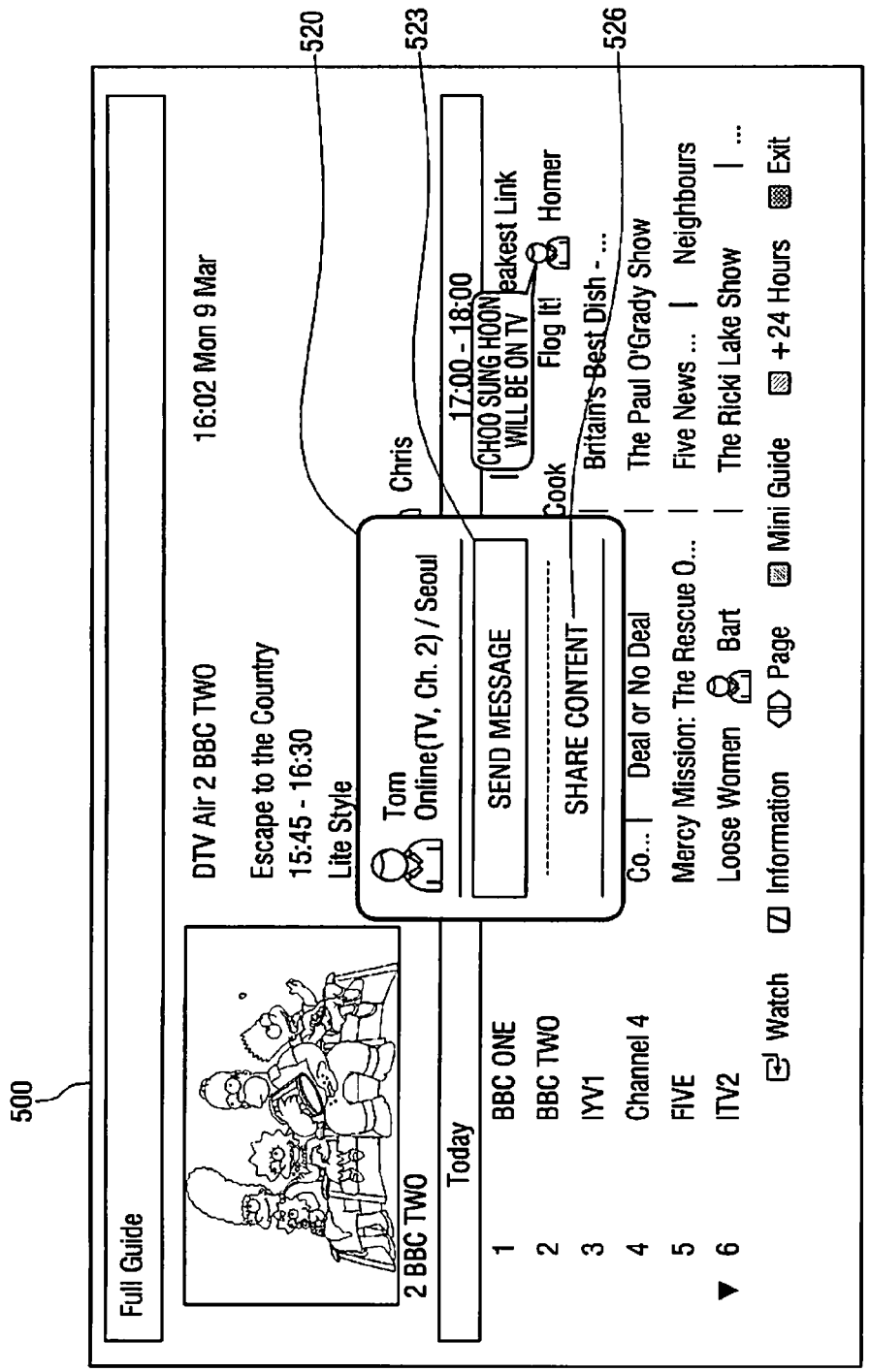

FIGS. 5A and 5B are diagrams illustrating a case where a friend watching the same program is selected on an EPG screen 500 according to an embodiment of the present invention.

FIG. 5A illustrates a case where one of friends who are watching a currently selected program is selected. As illustrated in FIG. 5A, if Tom 510 from among friends who are watching "Escape to the Country" is selected by a user, the TV 100 displays a menu 520 for performing a function regarding Tom 510.

As illustrated in FIG. 5B, the menu 520 includes an option for sending a message 523 and an option for sharing content 526. If the option for sending a message 523 is selected, the TV 100 receives a message from a user and transmits the input message to Tom's TV 210. If the option for sharing content 526 is selected, the TV 100 may search and copy content stored in Tom's TV 210.

As such, if a friend who is watching a program currently selected on the TV is selected on the EPG screen 500, the TV 100 displays a menu on the screen for sending a message to or sharing content with the selected friend.

Figure 6A:
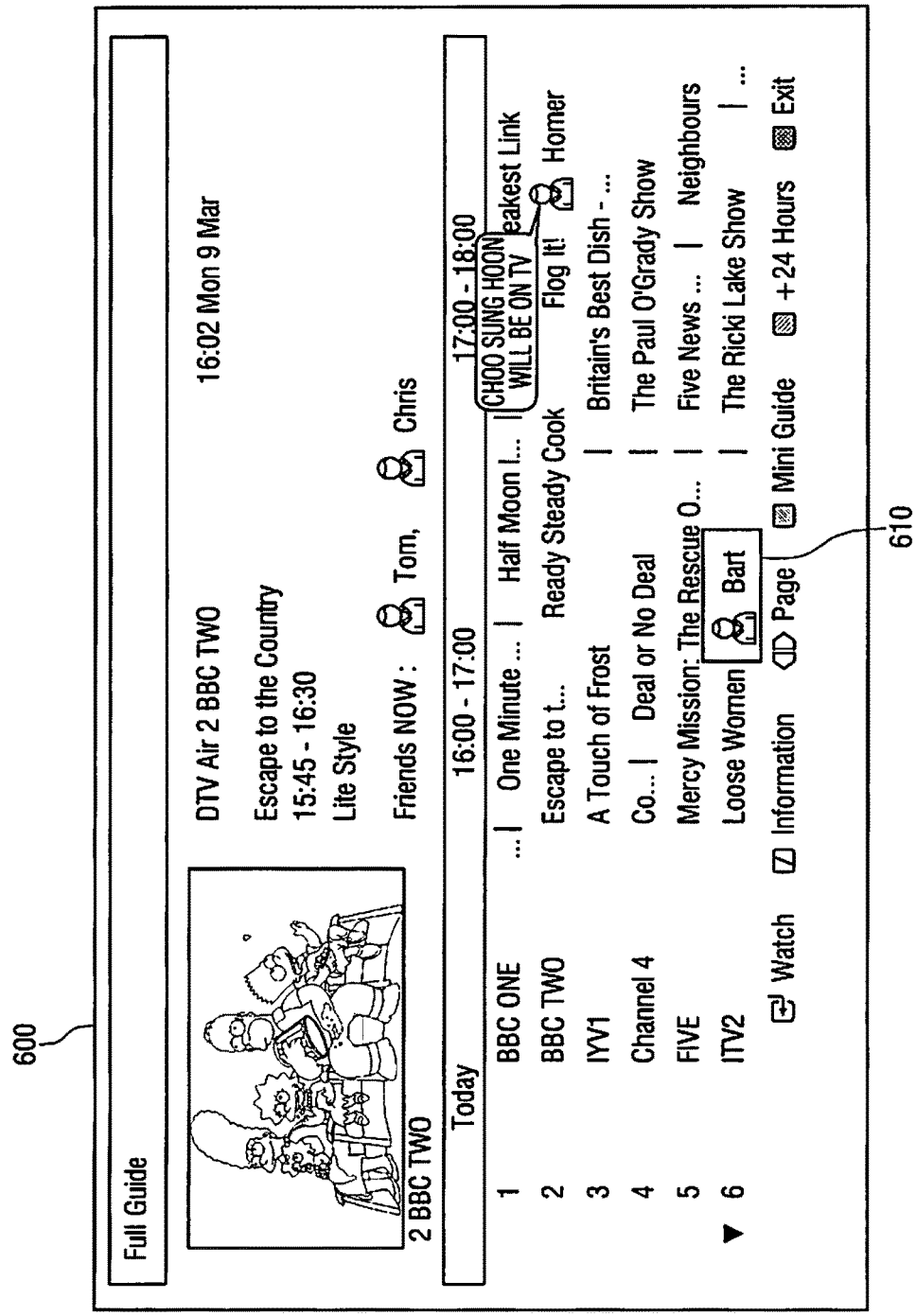
FIGS. 6A and 6B are diagrams illustrating a case where a friend watching a different program is selected on an EPG screen according to an embodiment of the present invention.
Figure 6B:
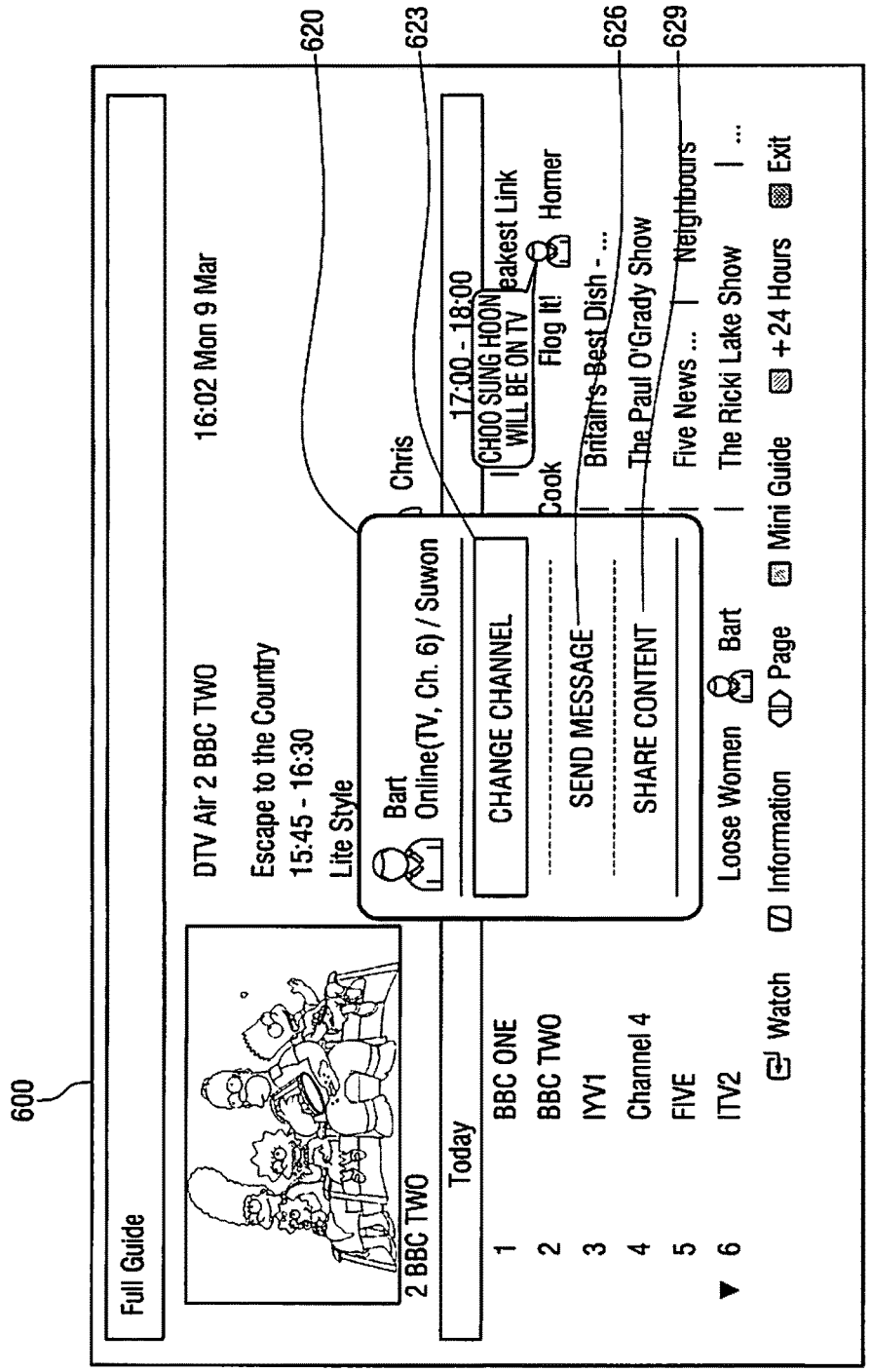

FIGS. 6A and 6B are diagrams illustrating a case where a friend watching a different program is selected on an EPG screen 600 according to an embodiment of the present invention.

FIG. 6A illustrates a scenario where a friend watching a different program is selected on the EPG screen 600. As illustrated in FIG. 6A, Bart 610 is watching "Loose Women" which is different from the currently selected program, "Escape to the Country". In FIG. 6B a menu 620, for performing a function regarding Bait 610 is displayed when a user selects Bart 610 on the EPG screen 600.

As illustrated in FIG. 6B, the menu 620 includes an option for changing a channel 623, an option for sending a message 626, and an option for sharing content 629. Herein, if the option for changing a channel 623 is selected, the TV 100 changes a current channel to a channel that the selected friend is watching. That is, if the option for changing a channel 623 is selected through user input, the TV 100 changes a current channel to channel 6 which Bart 610 is watching.

If the option for sending a message 626 is selected, the TV 100 receives a message from a user and transmits the input message to Bart's TV 230. If the option for sharing content 629 is selected, the TV 100 may search and copy content stored in Bart's TV 230.

As such, if a friend who is watching a program which is different from a program currently selected on the TV 100 is selected, the TV 100 displays the menu 620 on the screen for changing a current channel to a channel that the selected friend is watching, sending a message to the selected friend, or sharing content with the selected friend.

Figure 7A:
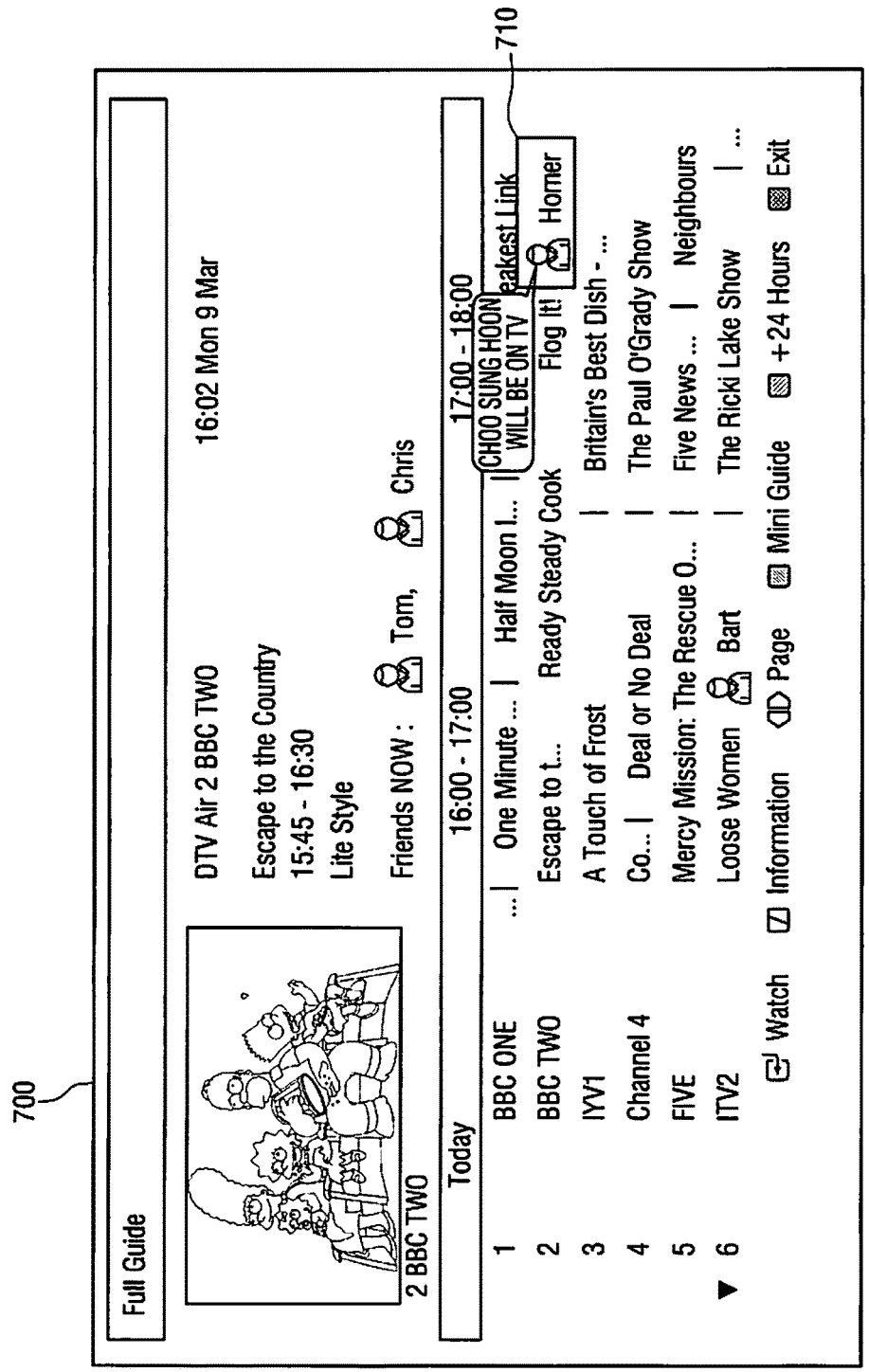
FIGS. 7A and 7B are diagrams illustrating a case where a friend who has reserved a program is selected on an EPG screen according to an embodiment of the present invention.
Figure 7B:
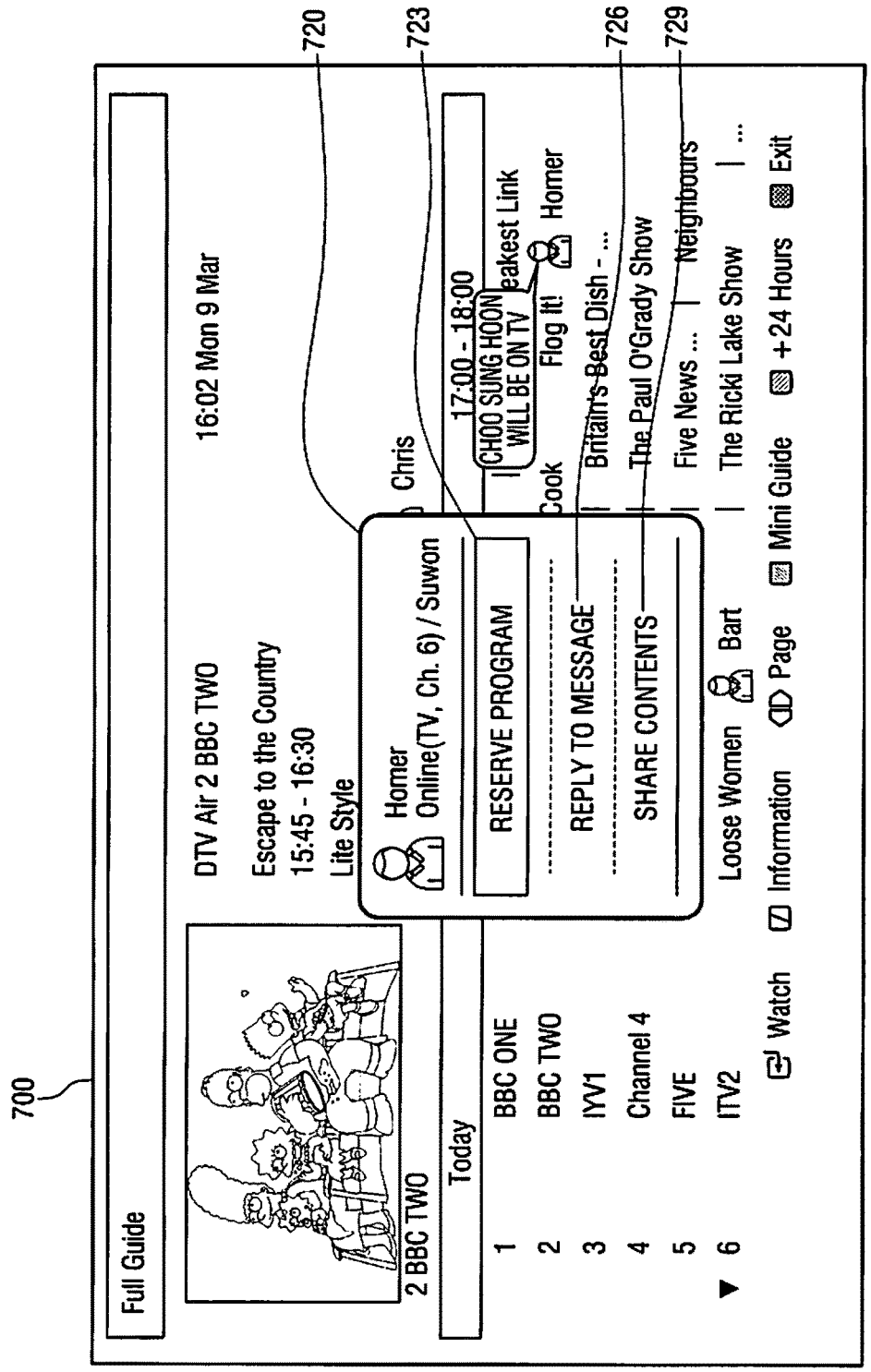

FIGS. 7A and 7B are diagrams illustrating a case where a friend who has reserved a specific program is selected on an EPG screen 700 according to an embodiment of the present invention.

FIG. 7A illustrates a case where one of friends who have reserved a specific program is selected on the EPG screen 700. As illustrated in FIG. 7A, it can be seen that Homer 710, one of friends, has reserved "Flog It" which has not been broadcast yet. If a user selects Homer 710, the TV 100 displays a menu 720 for performing a function regarding Homer 710 as illustrated in FIG. 7B.

As illustrated in FIG. 7B, the menu 720 includes an option for reserving a program 723, an option for writing a reply to a message 726, and an option for sharing content 729. Herein, if the option for reserving a program 723 is selected, the TV 100 reserves a specific program that the selected friend has reserved. That is, if the option for reserving a program 723 is selected through user input, the TV 100 reserves "Flog It" that Homer 710 has reserved.

If the option for writing a reply to a message 726 is selected, the TV 100 receives a reply to a message written by Homer and transmits the input reply to Homer's TV 240. If the option for sharing content 729 is selected, the TV 100 may search and copy content stored in Homer's TV 240.

As such, if a friend who is watching a program that is different from a program currently selected on the TV 100 is selected, the TV 100 displays the menu 720 on the screen for reserving a channel that the friend has reserved, sending a message to the selected friend, or sharing content with the selected friend.

Figure 8:
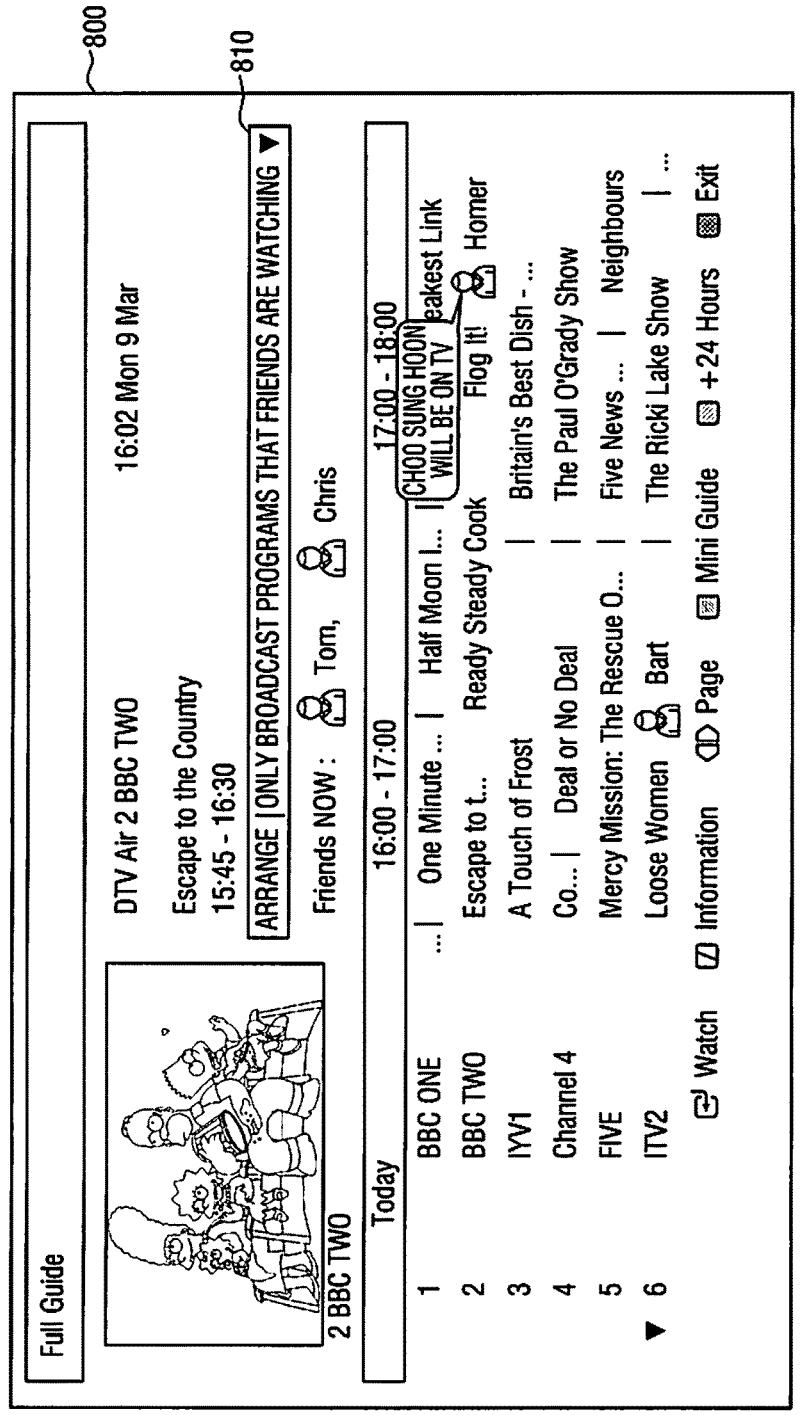
FIG. 8 is a diagram illustrating a screen on which a program arrangement selection menu is displayed according to an embodiment of the present invention.

FIG. 8 is a diagram illustrating a screen on which a program arrangement selection menu 810 is displayed according to an embodiment of the present invention.

As illustrated in FIG. 8, the broadcast program arrangement selection menu 810 may be displayed on the EPG screen 800. The TV 100 may arrange and display programs on the EPG screen 800 according to at least one method among a method of displaying only programs corresponding to information regarding a friend, a method of displaying only programs having comments input by the friend, and a method for displaying only programs reserved by the friend.

FIG. 8 illustrates a case where only programs corresponding to information regarding a friend are displayed on the EPG screen. That is, if "only broadcast programs that friends are watching" is selected on the broadcast program arrangement selection menu 810, the TV 100 displays only programs corresponding to the information regarding a friend on the EPG screen 800.

As such, the TV 100 may display broadcast programs on the EPG screen according to various methods.

Figure 9:
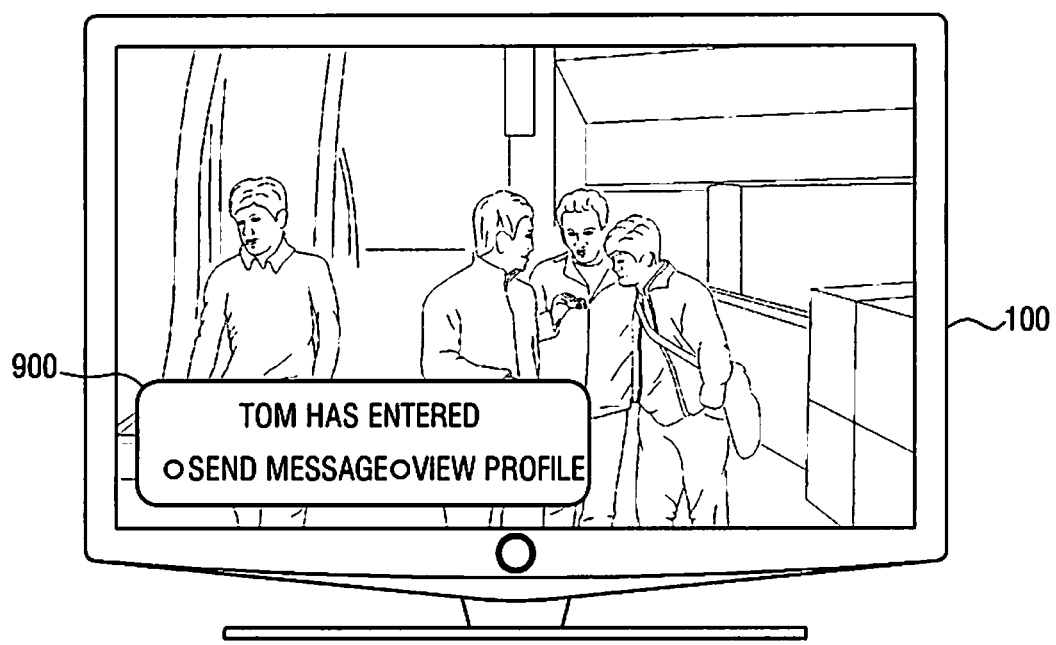
FIG. 9 is a diagram illustrating a message which is displayed when a friend changes his or her channel to the same channel while watching a television according to an embodiment of the present invention.

FIG. 9 is a diagram illustrating a message which is displayed when a friend changes his or her channel to the same channel while watching a television according to an embodiment of the present invention.

As illustrated in FIG. 9, if the TV 210 of Tom, who is registered as a friend in the buddy list, displays a current program while the TV 100 displays a program of the specific channel, the TV 100 displays a message 900 informing that Tom has entered, on the screen. The message 900 includes an option for sending a message and an option for viewing a profile.

As such, if the TV of a friend registered in the buddy list displays a program that is the same program, a message informing this is displayed on the screen. Accordingly, a user may easily identify that a registered friend is watching the same broadcast program.

Figure 10:
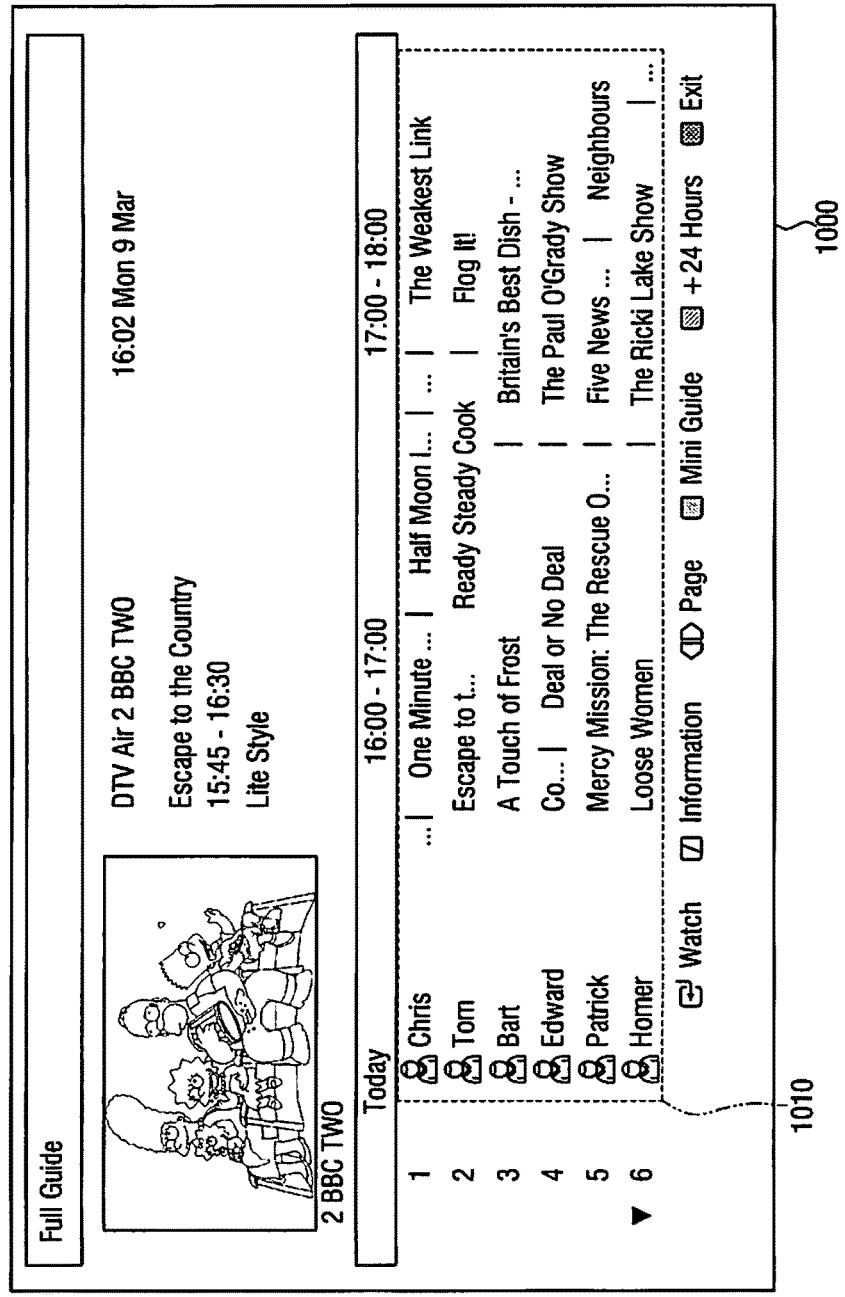
FIG. 10 is a diagram illustrating a case where a list of friends is displayed on an EPG screen according to an embodiment of the present invention.

FIG. 10 is a diagram illustrating a case where a list of friends 1010 is displayed on the EPG screen 1000 according to an embodiment of the present invention. As illustrated in FIG. 10, the TV 100 may display a list of friends 1010 that are currently registered on the EPG screen 1000. The TV 100 may display a broadcast program that is watched or registered by a friend registered in the buddy list 1010.

Accordingly, a user may easily identify a list of registered friends through the EPG screen.

In the embodiment of the present invention, the term 'buddy' is used for convenience of explanation, but is not limited thereto. That is, 'buddy' is used by the user of the TV 100 to call another user registered on the list, and the term 'buddy' may be replaced with another term as long as the term has the same meaning.

According to one embodiment of the present invention, the broadcast receiving apparatus is a television, only as an example. That is, any apparatus which receives EPG information through a broadcast signal and displays the EPG information on the screen may be the receiving apparatus. For example, the receiving apparatus may not only be a television but also a Digital Multimedia Broadcasting (DMB) receiver, a mobile phone, a Portable Media Player (PMP), or a navigation which is capable of receiving a broadcast signal.

Although several embodiments of the present invention have been shown and described, it would be appreciated by those skilled in the art that changes may be made in this embodiment without departing from the principles and spirit of the invention, the scope of which is defined in the appended claims.

What is claimed is:

1. A receiving apparatus, comprising:
a display;
a communicator configured to establish a connection with an external server; and
a processor configured to at least:
control the communicator to receive information regarding a program which is one of currently being watched and reserved by at least one user registered in a predetermined list and information regarding the at least one user from the external server,
control the display to provide the information regarding the at least one user and the program included in an Electronic Program Guide (EPG) on an EPG screen of the display,
in response to selecting a user of the at least one user provided on the EPG screen and a program corresponding to the selected user being broadcast, control the display to display a menu for switching to the program corresponding to the selected user, and
in response to the program corresponding to the selected user not being broadcast, control the display to display a menu for reserving the program corresponding to the selected user.

2. The receiving apparatus as claimed in claim 1, wherein the processor controls the display to display a user who is watching a broadcast program, from among users registered in the predetermined list, to correspond to the broadcast program for each broadcast program within the displayed EPG screen.

3. The receiving apparatus as claimed in claim 1, wherein the processor controls the display to display information regarding a user who reserves a broadcast program, from among a plurality of users registered in the buddy list, to correspond to the broadcast program for each broadcast program within the displayed EPG screen.

4. The receiving apparatus as claimed in claim 1, further comprising a receiver which receives the EPG or a broadcast signal including EPG information displayed within the EPG screen.

5. The receiving apparatus as claimed in claim 1, wherein the processor controls the display to display programs within the displayed EPG screen according to one method among a method of displaying only programs corresponding to the information regarding at least one user, a method of displaying only programs having comments input by the user, and a method for displaying only programs reserved by the user.

6. The receiving apparatus as claimed in claim 2, wherein the processor, in response to the user watching a same program broadcast in the currently selected channel being selected, controls the display to display the menu, such that the menu includes an option for sending a message to the selected user and an option for sharing content with the selected user.

7. The receiving apparatus as claimed in claim 2, wherein the processor, in response to the user watching a different program broadcast in the currently selected channel being selected, controls the display to display a menu for switching a current channel to a channel that the selected user is watching.

8. The receiving apparatus as claimed in claim 3, wherein the processor controls the display to display comments input by a user who reserves the program to correspond to the broadcast program.

9. The receiving apparatus as claimed in claim 3, wherein the processor, in response to a user corresponding to a program reserved by the user being selected, controls the display to display a menu for reserving the program.

10. A method for displaying an Electronic Program Guide (EPG), comprising:
　displaying the EPG;
　receiving information regarding a program which is one of currently being watched and reserved by at least one user registered in a predetermined list and information regarding the at least one user from an external server;
　providing the information regarding the at least one user and the program included in the EPG on a EPG screen; and
　in response to selecting a user of the at least one user provided on the EPG screen and a program corresponding to the selected user being broadcast, displaying a menu for switching to the program corresponding to the selected user, and
　in response to the program corresponding to the selected user not being broadcast, displaying a menu for reserving the program corresponding to the selected user.

11. The method as claimed in claim 10, further comprising: displaying a user who is watching a broadcast program, from among users registered in a buddy list, to correspond to the broadcast program for each broadcast program within the displayed EPG screen.

12. The method as claimed in claim 10, further comprising:
　displaying information regarding a user who reserves a broadcast program, from among a plurality of users registered in a buddy list, to correspond to the broadcast program for each broadcast program within the displayed EPG screen.

13. The method as claimed in claim 10, further comprising:
　displaying programs within the displayed EPG screen according to one method among a method of displaying only programs corresponding to the information regarding at least one user, a method of displaying only programs having comments input by the user, and a method for displaying only programs reserved by the user.

14. The method as claimed in claim 10, further comprising receiving a broadcast signal including EPG information displayed within the EPG screen.

15. The method as claimed in claim 11, wherein the menu, in response to the user watching a same program broadcast in the currently selected channel being selected, includes an option for sending a message to the selected user and an option for sharing content with the selected user.

16. The method as claimed in claim 11, further comprising:
　in response to the user watching a different program broadcast in the currently selected channel being selected, displaying a menu for switching a current channel to a channel that the selected user is watching.

17. The method as claimed in claim 12, wherein displaying the information regarding the user further comprises:
　displaying comments input by a user who reserves the program to correspond to the broadcast program.

18. The method as claimed in claim 12, further comprising:
　in response to a user corresponding to a program reserved by the user being selected, displaying a menu for reserving the program.

\* \* \* \* \*